(12) United States Patent
Eubanks et al.

(10) Patent No.: US 11,134,614 B2
(45) Date of Patent: Oct. 5, 2021

(54) PRODUCTIVITY INCREASE FOR A ROUND BALER

(71) Applicant: Deere & Company, Moline, IL (US)

(72) Inventors: Jason C. Eubanks, Hedrick, IA (US); Daniel E. Derscheid, Hedrick, IA (US)

(73) Assignee: DEERE & COMPANY, Moline, IL (US)

( * ) Notice: Subject to any disclaimer, the term of this patent is extended or adjusted under 35 U.S.C. 154(b) by 231 days.

(21) Appl. No.: 16/156,118

(22) Filed: Oct. 10, 2018

(65) Prior Publication Data

US 2020/0113136 A1 Apr. 16, 2020

(51) Int. Cl.
- *A01F 15/08* (2006.01)
- *A01F 15/07* (2006.01)
- *A01F 15/10* (2006.01)

(52) U.S. Cl.
CPC ...... *A01F 15/0833* (2013.01); *A01F 15/0715* (2013.01); *A01F 15/106* (2013.01); *A01F 2015/076* (2013.01)

(58) Field of Classification Search
CPC ............. A01F 15/0833; A01F 15/0715; A01F 15/106; A01F 2015/076
See application file for complete search history.

(56) References Cited

U.S. PATENT DOCUMENTS

| | | | | |
|---|---|---|---|---|
| 3,489,076 A | * | 1/1970 | Countryman | B65B 27/10 100/4 |
| 4,248,031 A | * | 2/1981 | Del Pozo, Jr. | B65B 11/045 53/556 |
| 4,433,619 A | * | 2/1984 | Anstey | A01F 15/07 100/40 |
| 4,447,287 A | * | 5/1984 | Hofbauer | H05K 13/003 156/552 |

(Continued)

FOREIGN PATENT DOCUMENTS

| | | | | |
|---|---|---|---|---|
| EP | 0432830 A1 | * | 6/1991 | ......... A01F 15/0715 |
| JP | 08124776 A | * | 5/1996 | ......... A01F 15/0715 |

(Continued)

OTHER PUBLICATIONS

European Search Report issued in counterpart European Patent Application No. 19198359.2 dated Feb. 14, 2020 (7 pages).

*Primary Examiner* — Behrang Badii
*Assistant Examiner* — Jalal C Coduroglu
(74) *Attorney, Agent, or Firm* — Taft Stettinius & Hollister LLP; Stephen F. Rost

(57) ABSTRACT

A system, method, and apparatus includes management of a net wrap cycle of a cylindrical bale in a baling chamber of a round baler. The baler includes a crop supply assembly that passes crop material into the baling chamber and a net wrap unit. An electronic controller determines a net wrapping condition of the bale in the baling chamber in response to operation of the crop supply assembly, initiates a net wrap (Continued)

start event to dispense a first portion of a net wrap material from the net wrap unit in response to the net wrapping condition being less than a full bale condition, and disengages a component from the crop supply assembly to stop operation of the crop supply assembly when the bale has satisfied the full bale condition. The net wrapping condition includes a diameter growth rate measurement being greater than a net wrap initiation threshold.

18 Claims, 6 Drawing Sheets

(56) References Cited

U.S. PATENT DOCUMENTS

| | | | | |
|---|---|---|---|---|
| 4,656,930 A | | 4/1987 | Van Den Bossche et al. | |
| 4,674,403 A | * | 6/1987 | Bryant | A01F 15/07 100/4 |
| 4,677,807 A | * | 7/1987 | Verhulst | A01F 15/0715 53/118 |
| 4,697,402 A | * | 10/1987 | Anstey | A01F 15/0715 53/506 |
| 4,899,651 A | * | 2/1990 | Lausch | A01F 15/0833 100/5 |
| 4,924,405 A | * | 5/1990 | Strasser | A01F 15/0833 100/4 |
| 4,995,216 A | * | 2/1991 | Vansteelant | A01F 15/0715 53/118 |
| 5,115,734 A | * | 5/1992 | Quartaert | A01F 15/0705 100/5 |
| 5,319,899 A | * | 6/1994 | Jennings | A01F 15/0715 53/118 |
| 5,419,108 A | * | 5/1995 | Webb | A01F 15/106 100/88 |
| 5,433,059 A | * | 7/1995 | Kluver | A01F 15/0715 53/118 |
| 5,447,022 A | * | 9/1995 | Webb | A01F 15/106 100/89 |
| 5,448,873 A | * | 9/1995 | Jennings | A01F 15/0715 53/118 |
| 5,595,055 A | * | 1/1997 | Horchler, Jr. | A01D 90/02 100/88 |
| 5,687,548 A | * | 11/1997 | McClure | A01F 15/0715 53/118 |
| 5,816,038 A | * | 10/1998 | Anderson | A01F 15/141 56/341 |
| 5,855,167 A | * | 1/1999 | Goossen | A01F 15/141 100/13 |
| 6,209,450 B1 | * | 4/2001 | Naaktgeboren | A01F 15/141 100/4 |
| 6,247,291 B1 | * | 6/2001 | Underhill | A01F 15/0715 242/598.5 |
| 6,446,548 B2 | * | 9/2002 | Chow | A01F 15/141 100/13 |
| 6,622,455 B2 | * | 9/2003 | Davis | A01F 15/0715 100/4 |
| 6,644,005 B1 | * | 11/2003 | Grahl | A01F 15/085 100/88 |
| 7,197,979 B2 | * | 4/2007 | Derscheid | A01F 15/0833 100/87 |
| 7,404,355 B2 | * | 7/2008 | Viaud | A01F 15/0883 100/4 |
| 7,409,814 B2 | * | 8/2008 | Hood | A01F 15/0715 100/4 |
| 7,640,852 B1 | * | 1/2010 | Anstey | A01F 15/0833 100/88 |
| 7,694,504 B1 | * | 4/2010 | Viaud | A01D 90/04 56/341 |
| 7,937,923 B2 | * | 5/2011 | Biziorek | A01F 15/0833 56/341 |
| 8,011,295 B1 | * | 9/2011 | Smith | A01F 15/148 100/4 |
| 8,056,314 B1 | * | 11/2011 | Anstey | A01F 15/106 56/364 |
| 8,134,499 B2 | * | 3/2012 | Wang | G01C 21/165 342/357.3 |
| 8,291,687 B2 | * | 10/2012 | Herron | A01F 15/0705 56/341 |
| 8,413,414 B2 | * | 4/2013 | Herron | A01F 15/0715 56/341 |
| 8,516,957 B1 | * | 8/2013 | Merritt | B30B 9/3082 100/88 |
| 8,925,287 B2 | * | 1/2015 | Derscheid | A01F 15/0715 53/168 |
| 9,415,888 B2 | * | 8/2016 | Smith | A01F 15/0715 |
| 9,493,262 B2 | * | 11/2016 | Lancaster, III | B65B 11/025 |
| 10,034,433 B2 | * | 7/2018 | Kraus | A01F 15/07 |
| 10,595,464 B2 | * | 3/2020 | Underhill | A01F 15/071 |
| 10,687,472 B2 | * | 6/2020 | Derscheid | A01F 15/0833 |
| 2005/0091959 A1 | * | 5/2005 | Viaud | A01F 15/0715 56/341 |
| 2006/0048481 A1 | * | 3/2006 | Hood | A01F 15/0715 53/399 |
| 2010/0162676 A1 | * | 7/2010 | Simmons | A01F 15/0715 56/341 |
| 2011/0023732 A1 | * | 2/2011 | Herron | A01F 15/08 100/40 |
| 2012/0240527 A1 | * | 9/2012 | Herron | A01F 15/0715 53/461 |
| 2017/0049058 A1 | * | 2/2017 | Eubanks | A01F 15/0715 |
| 2017/0057680 A1 | * | 3/2017 | Schlichting | A01F 15/0715 |
| 2017/0287303 A1 | * | 10/2017 | Lang | A01F 15/08 |
| 2019/0116736 A1 | * | 4/2019 | Smith | A01F 15/0883 |
| 2019/0133044 A1 | * | 5/2019 | Thompson | A01F 15/0883 |
| 2019/0177024 A1 | * | 6/2019 | Lancaster, III | B65B 57/04 |
| 2019/0281766 A1 | * | 9/2019 | Kappelman | A01F 15/10 |
| 2019/0343052 A1 | * | 11/2019 | Derscheid | A01F 15/0833 |
| 2020/0113136 A1 | * | 4/2020 | Eubanks | A01F 15/106 |
| 2020/0196515 A1 | * | 6/2020 | Engel | A01C 7/088 |
| 2020/0205348 A1 | * | 7/2020 | Sloan | A01F 15/0833 |
| 2020/0214219 A1 | * | 7/2020 | Lebeau | A01F 15/07 |
| 2020/0260645 A1 | * | 8/2020 | Seimetz | A01F 15/106 |

FOREIGN PATENT DOCUMENTS

| | | |
|---|---|---|
| WO | 2006028819 A2 | 3/2006 |
| WO | 2016114652 A1 | 7/2016 |

* cited by examiner

PRODUCTIVITY INCREASE FOR A ROUND BALER

FIELD OF THE DISCLOSURE

The present disclosure relates to a round baler, and in particular, to an arrangement for efficient wrapping of agricultural crop into bales with a wrap material.

BACKGROUND OF THE DISCLOSURE

Round balers are designed to form agricultural crops into cylindrical rolls or bales. Such balers include some type of mechanism for wrapping the formed bales with a wrap material including net wrap, which is a sheet material typically in the form of light, thin web material, or twine.

Over time, many operators have a preference for net wrap over twine since wrapping the bale with multiple layers of net wrap is typically quicker than spiraling twine around the bale to wrap or bind it. To most operators, productivity improvement is important and decreasing the amount of time required to wrap the bale so that the bale can be ejected and continue baling rather than sitting still and waiting during the wrapping stage. When an operator is notified during a baling process that a bale in the baling chamber is almost to a desired size or diameter, the operator must stop forward motion of the vehicle to net wrap the bale. During the time period when the operator decreases speed of the vehicle until the vehicle is fully stopped from forward travel, the baler continues to collect agricultural crop into the baling chamber and the bale continues to grow in size.

Typically operators will set a delay to warn the operator that a full bale is almost achieved to allow the operator sufficient time to stop the forward motion of the vehicle and stop collection of crop material. If the operator does not stop the forward motion of the vehicle within this time delay, then the continued forward motion of the tractor can cause inconsistent bale diameters between bales in a field. Moreover, different crop conditions can require a longer or shorter time period for the vehicle to stop. For example, when the operator is baling a heavy volume crop the vehicle is traveling slower than when the operator is baling a lighter volume crop. Therefore a time delay when the vehicle is traveling in heavy volume crop may seem too long as compared to the same time delay during travel in the lighter volume crop which may be inadequate for the vehicle to completely stop forward motion during the delay.

While the vehicle is in a stationary position, the operator waits some period of time until the baler stops collecting crop into the baling chamber. The operator also waits an additional period of time for the net wrap process to wrap the bale. These idle times decrease productivity for the operator. Moreover, as the operator continues baling a field the idle time accumulates each time the operator must stop and wait until each bale is net wrapped. The idle time accumulation is even larger in fields with a heavy volume agricultural crop as the crop quickly fills the baling chamber and the operator must stop the vehicle more frequently to net wrap each of the bales.

If the operator does not stop forward movement of the tractor prior to net wrapping the bales, then collection of the crop will continue during the net wrap process. Typically a bale is wrapped with two to four layers of net wrap. In this situation, a first layer of net wrap is placed around the bale while the crop feeds into the baling chamber. The additional crop is collected over the first layer of net wrap such that as the second layer of net wrap is placed around the bale the additional crop becomes trapped between the first and second layers of net wrap. The trapped or caught crop between the first and second layers of net wrap is problematic when one removes the net wrap for access to the agricultural crop in the bale. To access the crop within the bale, the outer layer of net wrap is removed first however often the crop caught between the outer and inner layers of net wrap becomes embedded in the outer layer. The outer layer of net wrap and the crop embedded and attached to it are difficult to remove from the bale, and difficult to handle and dispose of. The user must also remove any additional crop between the outer and inner layers before removing the inner layer of net wrap to access the crop in the bale.

Thus there is a need for improvement for efficiently and effectively net wrapping bales of crop material.

SUMMARY

The present disclosure may comprise one or more of the following features and combinations thereof.

According to one embodiment of the present disclosure, an apparatus comprising an electronic controller for a round baler having a baling chamber, a crop supply assembly configured to pass a crop material into the baling chamber, and a net wrap unit, the electronic controller configured to determine a net wrapping condition of a cylindrical bale in the baling chamber in response to operation of the crop supply assembly; initiate a net wrap start event to dispense a first portion of a net wrap material from the net wrap unit in response to the net wrapping condition; and disengage a component from the crop supply assembly to stop operation of the crop supply assembly when the cylindrical bale has satisfied a full bale condition.

In a further embodiment, the net wrapping condition includes a diameter growth rate measurement of the cylindrical bale being equal to or greater than a net wrap initiation threshold.

In a further embodiment, the net wrapping condition includes an estimated time period for the net wrap material to circumferentially wrap the cylindrical bale.

In a further embodiment the full bale condition includes a diameter of the cylindrical bale being equal to or greater than a net termination condition of the cylindrical bale.

In a further embodiment, the component from the crop supply assembly includes a pickup device. In a further refinement, the crop supply assembly includes a clutch device configured to disengage the pickup device.

In a further embodiment, the electronic controller is configured to initiate a stopping event for the round baler such that the round baler is restricted from movement along the ground surface in response to determining the net wrapping condition.

According to another embodiment of the present disclosure, an apparatus comprises an electronic controller for a round baler having a baling chamber, a crop supply assembly configured to pass a crop material into the baling chamber, and a net wrap unit, the electronic controller configured to initiate a net wrap start event to dispense a first portion of a net wrap material from the net wrap unit in response to a net wrapping condition of a cylindrical bale in the baling chamber; disengage a component from the crop supply assembly to stop operation of the crop supply assembly when the cylindrical bale has satisfied a full bale condition; and initiate a net wrap finish event to dispense a second portion of the net wrap material from the net wrap unit in response to a full bale condition of the cylindrical bale.

In a further embodiment, the net wrapping condition includes a diameter growth rate measurement of the cylindrical bale being equal to or greater than a net wrap initiation threshold.

In a further embodiment, the net wrapping condition includes an estimated time period for the net wrap material to circumferentially wrap the cylindrical bale.

In a further embodiment, the full bale condition includes a diameter of the cylindrical bale being equal to or greater than a net termination condition of the cylindrical bale.

In a further embodiment, the component is a clutch device, and the crop supply assembly further includes one or more rotors, wherein the clutch device is configured to disengage the one or more rotors.

In a further embodiment, the electronic controller is configured to initiate a stopping event for the round baler such that the round baler is restricted from movement along the ground surface in response to initiating the net wrap start event.

In a further embodiment, upon completion of the net wrap finish event the electronic controller is configured to eject the cylindrical bale from the baling chamber and re-engage the component from the crop supply assembly to enable operation of the crop supply assembly.

According to yet another embodiment of the present disclosure, an apparatus comprises an electronic controller for a round baler having a baling chamber, a crop supply assembly configured to pass a crop material into the baling chamber, and a net wrap unit, the electronic controller configured to measure a diameter of a cylindrical bale in the baling chamber; estimate a growth rate of the diameter of the cylindrical bale in response to operation of the crop supply assembly; and initiate a net wrap start event to dispense a first portion of a net wrap material from the net wrap unit when the estimated growth rate satisfies a net wrap initiation threshold.

In a further embodiment, the electronic controller is configured to disengage a component from the crop supply assembly to stop operation of the crop supply assembly when the cylindrical bale has satisfied a full bale condition. In a further refinement, the component is a clutch device, and the crop supply assembly further includes one or more rotors, wherein the clutch device is configured to disengage the one or more rotors. In yet a further refinement, the electronic controller is configured to initiate a net wrap finish event to dispense a second portion of the net wrap material from the net wrap unit in response to the full bale condition of the cylindrical bale. In a yet further refinement, after completion of the net wrap finish event, the electronic controller is configured to re-engage the component to enable operation of the crop supply assembly.

In a further embodiment, the electronic controller is configured to initiate a stopping event for the round baler such that the round baler is restricted from movement along the ground surface in response to initiation of the net wrap start event.

According to yet another embodiment of the present disclosure, a method comprises operating a crop supply assembly to pass a crop material into a baling chamber of a round baler, determining with an electronic controller a net wrapping condition of a cylindrical bale in the baling chamber being less than a full bale condition in response to operation of the crop supply assembly, initiating a net wrap start event to dispense a first portion of a net wrap material from a net wrap unit on the round baler in response to the net wrapping condition, and disengaging a component from the crop supply assembly to stop operation of the crop supply assembly when the cylindrical bale has satisfied a full bale condition.

In a further embodiment, the disengaging the component from the crop supply assembly includes disengaging a clutch device.

In a further embodiment, further comprising dispensing a second portion of the net wrap material from the net wrap unit in response to the full bale condition of the cylindrical bale being satisfied. In yet a further refinement, further comprising restricting the baler from movement along the ground surface in response to initiating the net wrap start event.

This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

Figure 1:
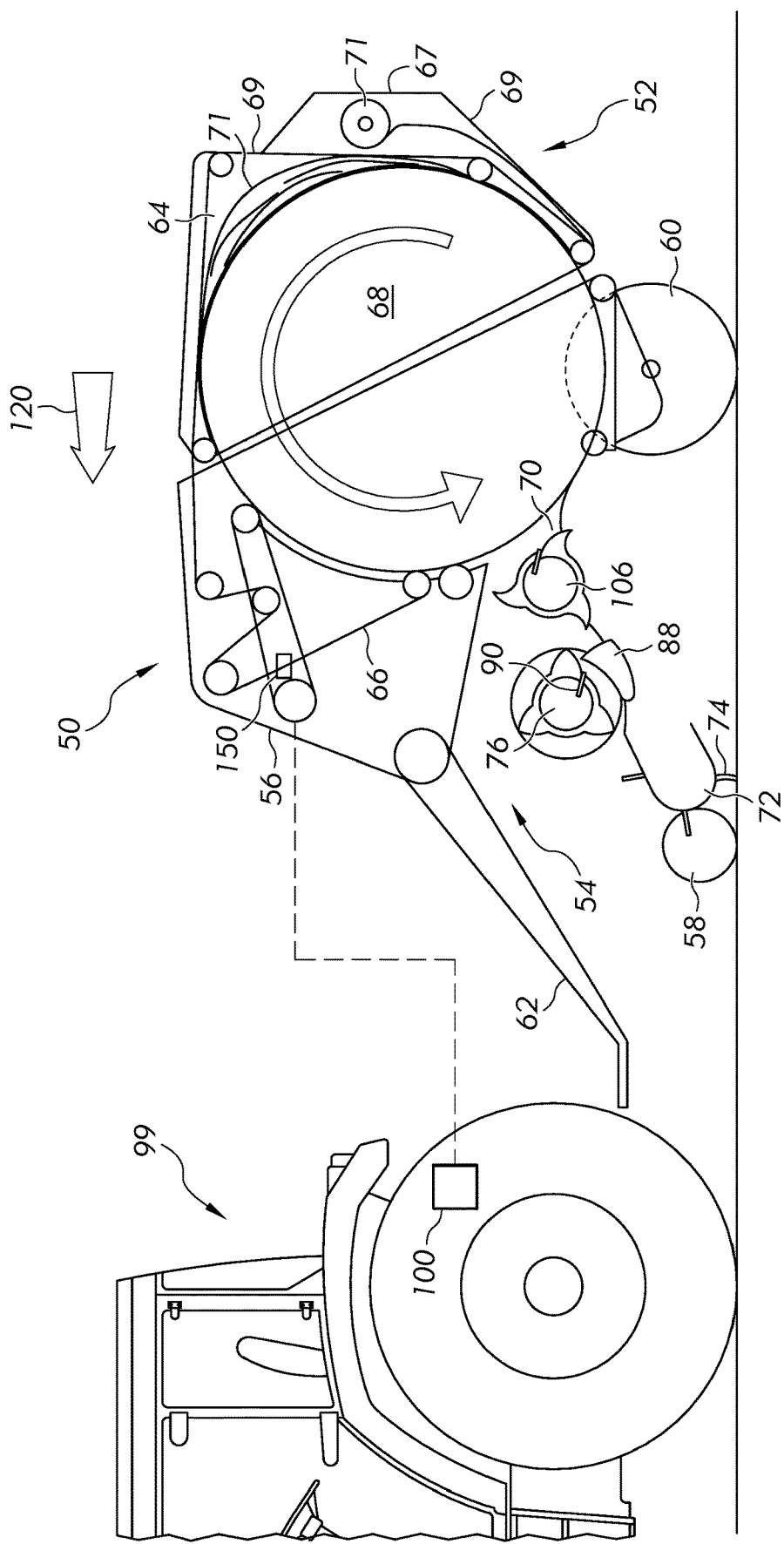
FIG. 1 is a schematic left side view of a round baler.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Some of the benefits of the present disclosure includes application to either a rear baler or a front baler. Moreover the initiation of the net wrapping process is not dependent on the vehicle stopping forward motion or travel, instead initiation of net wrapping can start while the vehicle is still moving which speeds up the net wrapping process since the operator is not required to stop motion of the baler to initiate the net wrapping process. Moreover, a quicker wrapping process occurs as a result of the present disclosure since the net wrap material can be wrapped around most of the bale while the baler is still moving and the crop feeding system is still supplying crop material into the baling chamber. The crop feeding system is automatically disengaged after a full bale condition is satisfied therefore no crop material collects between the layers of net wrap material.

Figure 2:
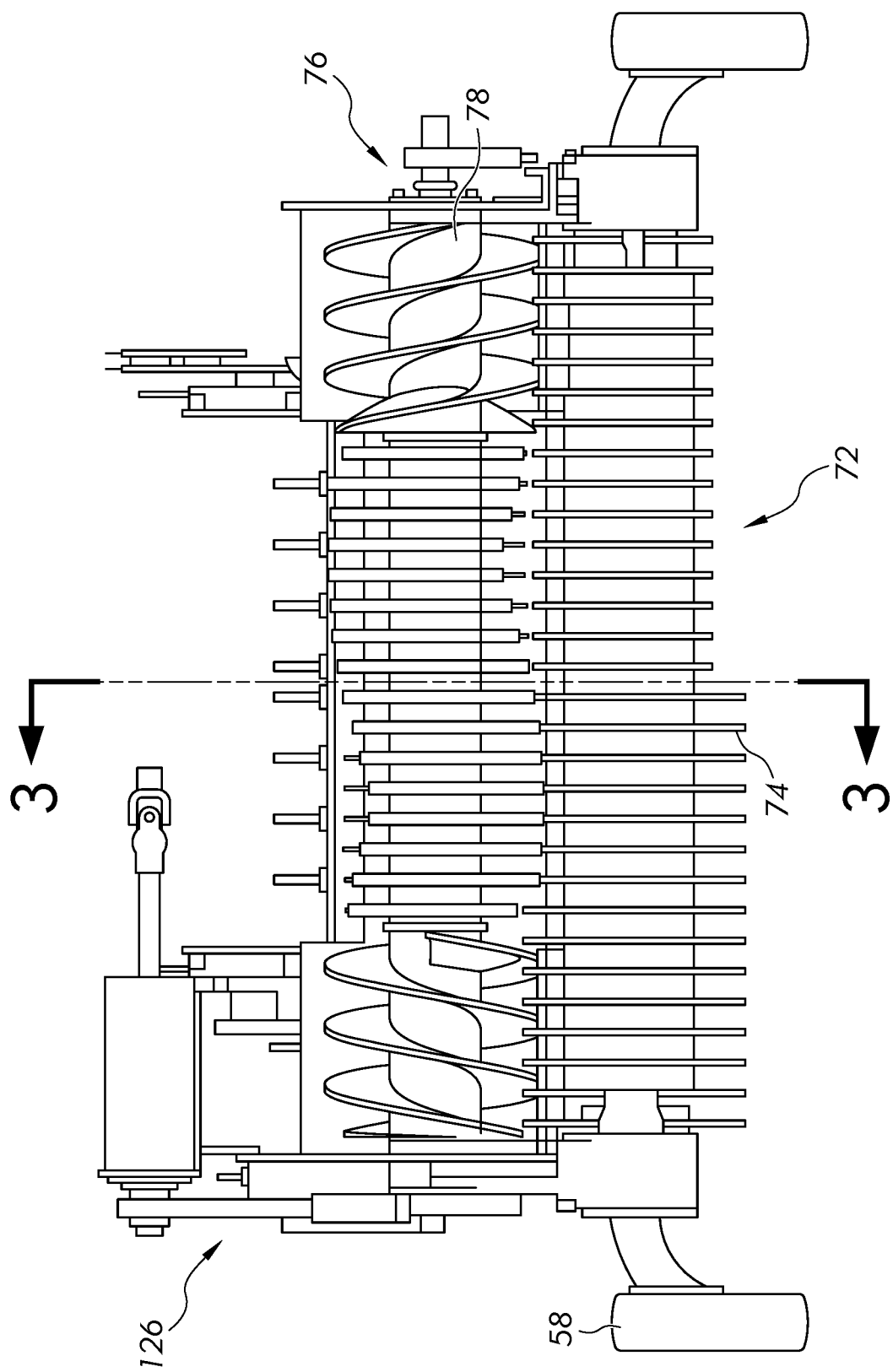
FIG. 2 is a partial front view of a crop supply assembly of the baler of FIG. 1.
Figure 3:
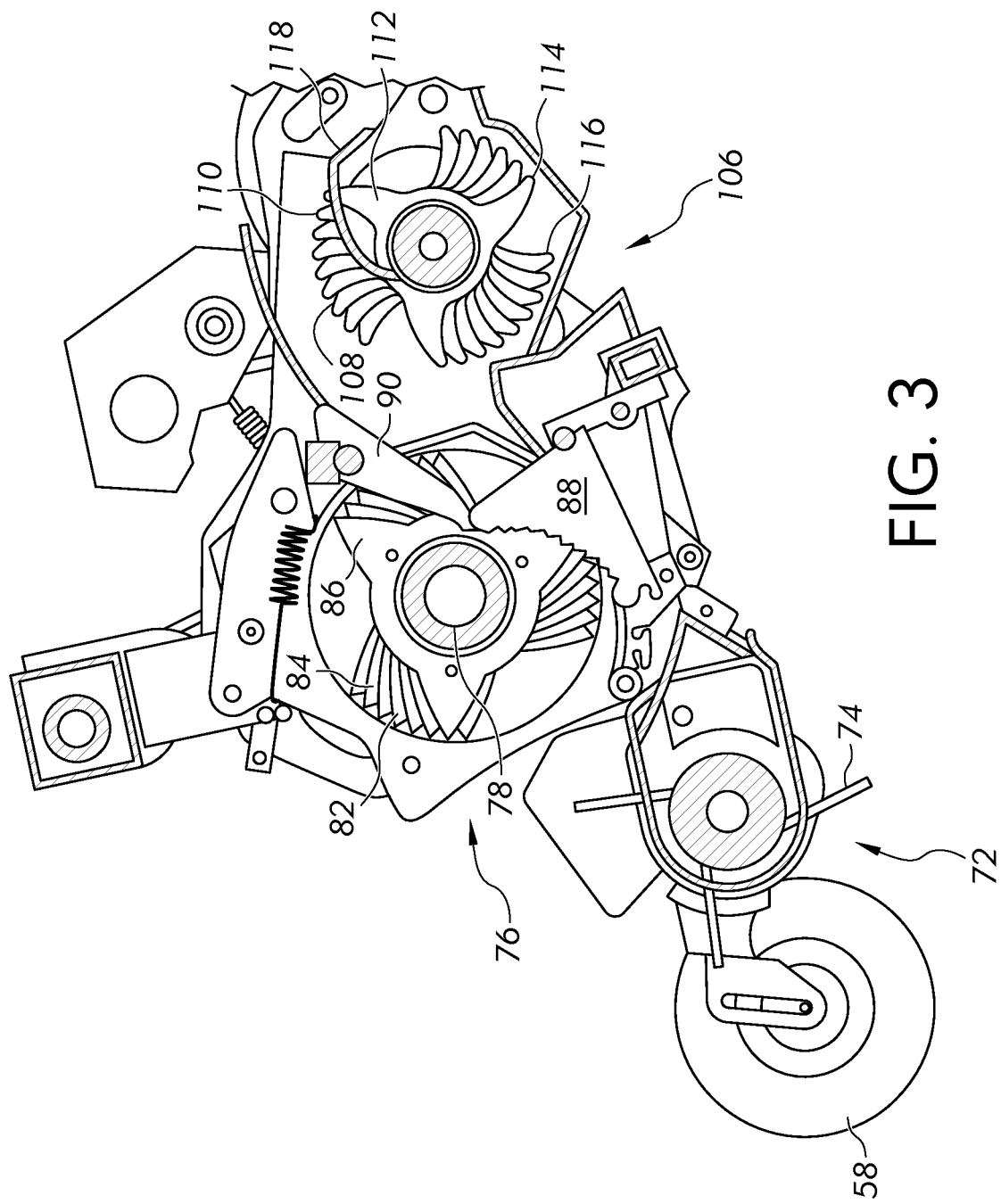
FIG. 3 is a cross-sectional view along lines 3-3 of FIG. 2.

The present disclosure can be used with any type of round baler, including variable chamber balers or fixed chamber balers. Referring now to FIGS. 1, 2, and 3 is one type of a round baler 50 for illustration only. Round baler 50 includes a chassis 52 and a crop supply assembly 54. In one form, the round baler 50 includes an electronic controller 100 that is operatively connected to the chassis 52 and the crop supply assembly 54 as described below. In the illustrated form, a towing vehicle 99 includes the electronic controller 100 that is operatively connected to the round baler 50. The chassis 52 includes a frame 56 supported on wheels 60, a towbar 62, side walls 64, a baling arrangement 66, a potentiometer 150, and a net wrap unit 67 mounted on a rear of the frame 56. An axle forms the connection between the wheels 60 and the frame. The wheels support the frame 56 on the ground so that it can move freely and be drawn across the field by the tow bar 62 due to its connection with a towing vehicle (not illustrated). The side walls 64 are spaced away from each other by the width of, and define opposite sides of, the baling chamber 68. The baler 50 includes a discharge gate 69 at the rear of the baling chamber 68 and that spans between the side walls 64. The discharge gate 69 is operable to eject the bale within the baling chamber 68. An inlet 70 into the baling chamber 68 is provided at the forward lower end region of the baling arrangement 66 and is configured to receive crop material into the baling chamber 68. The net wrap unit 67 includes a net pan 69 that is configured to receive and store a net wrap material 71 therein and dispense the net wrap material 71 into the baling chamber 68. The net wrap unit 67 includes an electric actuator or some other drive mechanism that operates or dispenses the net wrap material 71 and a cutting mechanism that cuts the net wrap material 71 when a full bale condition is satisfied. The net wrap material 71 can include any type of sheet material or bale wrap including plastic or other material. The net wrap material 71 is configured to cover crop material coming into the baling chamber 68 as described in more detail below.

The electronic controller 100 is configured to monitor a bale growth rate and measure the bale size or diameter. The electronic controller 100 can be coupled to the potentiometer 150 or a bale sensor that is configured to measure a diameter or size of a bale. In the illustrated form the potentiometer 150 measures the rotation of a belt tensioner wherein the position of the potentiometer 150 is related to the outer diameter of the bale. The output from the potentiometer 150 or the bale sensor is monitored by the electronic controller 100 as the bale grows in size as crop material is collected in the baling chamber 68 as described in more detail below.

The electronic controller 100 is configured to control and monitor a number of other functions of the baler 50, in addition to monitoring the bale size of the bale, such as triggering or starting a net wrapping event wherein the net wrap unit 67 dispenses a first portion of the net wrap material 71 from the net wrap unit 67, and disengaging at least one component from the crop supply assembly 54. The electronic controller 100 is also configured to initiate a net wrap finish event wherein the net wrap unit 67 dispenses a second portion of the net wrap material 71 in response to a full bale condition of the bale in the baling chamber 68. The electronic controller 100 is also configured to operate the discharge gate 69 to open the discharge gate 69 and eject the wrapped bale from the baling chamber 68. The electronic controller 100 is configured to re-engage the component from the crop supply assembly 54 to enable operation of the crop supply assembly 54 upon completion of the net wrap finish event. The electronic controller 100 is configured to initiate a stopping event for the baler 50 such that the baler 50 is restricted from movement along the ground surface in response to determining the net wrapping condition.

The present disclosure can be used with any type of crop assembly and one type of crop supply assembly 54 is shown for illustration only. In other forms the crop supply assembly may be configured differently such as including fewer rotor assemblies or possibly more rotor assemblies. The crop supply assembly 54 is composed of components that are located upstream of the inlet 70 and includes a take-up device 72. The take-up device 72 is generally characterized as a pick-up and is provided with tines 74 that raise the crop to be baled from the ground and deliver it to the baling chamber 68. An additional set of wheels 58 function as gauge wheels pivoting the front portion to maintain the spacing between the take-up device 72 and the ground.

Crop which has been lifted from the ground and passed over the pick-up device 72 is presented to a rotor assembly configured as an undershot combination precutter and transverse conveyor 76 which functions to both cut and transversely converge the crop to a more narrow width. A generally cylindrical rotor core or shaft 78 has a central region that supports a plurality of rotatable crop conveying members such as 82, 84 and 86. There is a set of cutting blades or knives 88 interleaved (e.g., one blade between each adjacent pair of conveying members) with the conveying members for cutting crop as it is conveyed followed downstream by a set of relatively fixed strippers 90 also interleaved with the conveying members for urging cut crop away from the members. The strippers 90 may take the form of a rake or comb-like assembly for dislodging crop from the crop conveying members.

The combination precutter and transverse conveyor is configured to receive swath crop material from the pick-up arrangement 72 and urge the received crop in the direction of shaft 78. The functions of the combination precutter and transverse conveyor may be separated by employing any suitable crop width converging system upstream of the precutter. For example, a converging auger arrangement such as cantilevered or stub augers may be employed.

An overshot secondary feed rotor 106 is located downstream or rearward of the precutter rotor assembly 76 for conveying the precut crop to the baling chamber 68. Rotor 106 creates an S-shaped or serpentine crop path and is a positive feeder for bale starting. The secondary feed rotor 106 includes a set of rotating crop conveying members in the form of generally parallel plates 108, 110, 112 each having a number of outwardly protruding crop engaging fingers such as 114 and 116 interleaved with strippers 118 for conveying cut crop away from the blades and into the baling chamber inlet 70.

During operation, the baler 50 is drawn in the direction of arrow 120 by a tractor which also supplies power by way of hydraulic lines or other schemes to drive the shafts of the pick-up 72, precutter rotor assembly 76 and secondary rotor 106. The peripheral feed speeds of these three units may be selectively engaged or disengaged by a drive mechanism 126 indicated generally in FIG. 2. In one form, the drive mechanism 126 includes a clutch device for each of the shafts of the pick-up 72, precutter rotor assembly 76 and secondary rotor 106 of the crop supply assembly 54. In other forms, the drive mechanism 126 includes a single clutch device for operation of the shafts of the pick-up 72, precutter rotor assembly 76 and secondary rotor 106 of the crop supply assembly 54. The clutch devices or single clutch device operate to engage the shafts of the pick-up 72, precutter rotor assembly 76 and secondary rotor 106 of the crop supply assembly 54 to begin or continue operation of the crop supply assembly 54 as described more below. The clutch devices can be electrohydraulic, hydraulic, and/or electric or hydraulic motors.

The clutch devices can also disengage the shafts of the pick-up 72, precutter rotor assembly 76 and secondary rotor 106 of the crop supply assembly 54 to stop operation of the crop supply assembly 54 when the cylindrical bale in the baling chamber 68 has satisfied a full bale condition as described more below. In one form, the clutch device for the pick-up 72 operates to disengage the shaft for the pick-up 72 to stop operation of the crop supply assembly 54 when the cylindrical bale has satisfied the full bale condition as described more below. In another form, any or all of the clutch device for the pick-up 72, the clutch device for the precutter rotor assembly 76, and the clutch device for the secondary rotor 106 are disengaged when the cylindrical bale has satisfied the full bale condition. When the cylindrical bale has satisfied the full bale condition, it is noted that the operation of the crop supply assembly 54 stops which provides a more consistent bale diameter between bales formed in the baling chamber 68 because the crop supply assembly 54 has ceased or stopped feeding crop material into the baling chamber 68 automatically. Moreover, since the crop supply assembly 54 has ceased or stopped feeding crop material into the baling chamber 68 there will not be crop material caught between the layers of the net wrap material 71.

The pick-up 72 and precutter rotor 76 are counter-rotating with the pick-up rotating in a clockwise direction as viewed in FIG. 1 while the precutter rotor revolves in a counter-clockwise (undershot) direction. The precutter rotor and secondary feed rotor 106 are also counter-rotating since the secondary feed rotor 106 rotates in a clockwise direction as viewed in FIG. 1. Pick-up 72 raises a swath of crop which passes over the pick-up and then beneath the precutter rotor assembly 76. As the central portion of the conveyed crop passes under the rotor, it first encounters the cutter blades 88 and later is dislodged from the rotor by strippers 90. The crop material is drawn by the secondary rotor 106 into the baler inlet 70. The baler chamber operates in known fashion to produce the large round bales.

The electronic controller 100 is structured or configured to perform certain operations to control a net wrap cycle process. In certain embodiments, the electronic controller 100 forms a portion of a processing subsystem including one or more computing devices having memory, processing, and communication hardware. The electronic controller 100 may be a single device or a distributed device, and the functions of the electronic controller 100 may be performed by hardware or by instructions encoded on computer readable medium. The electronic controller 100 may be included within, partially included within, or completely separated from an engine controller (not shown) on the towing vehicle. The electronic controller 100 is in communication with any sensor or actuator throughout the round baler 50, including through direct communication, communication over a datalink, and/or through communication with other controllers or portions of the processing subsystem that provide sensor and/or actuator information to the electronic controller 100.

In certain embodiments, the electronic controller 100 is described as functionally executing certain operations. The descriptions herein including the controller operations emphasizes the structural independence of the controller, and illustrates one grouping of operations and responsibilities of the controller. Other groupings that execute similar overall operations are understood within the scope of the present application. Aspects of the controller may be implemented in hardware and/or by a computer executing instructions stored in non-transient memory on one or more computer readable media, and the controller may be distributed across various hardware or computer based components.

Example and non-limiting controller implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

The listing herein of specific implementation elements is not limiting, and any implementation element for any controller described herein that would be understood by one of skill in the art is contemplated herein. The controllers herein, once the operations are described, are capable of numerous hardware and/or computer based implementations, many of the specific implementations of which involve mechanical steps for one of skill in the art having the benefit of the disclosures herein and the understanding of the operations of the controllers provided by the present disclosure.

One of skill in the art, having the benefit of the disclosures herein, will recognize that the controllers, control systems and control methods disclosed herein are structured to perform operations that improve various technologies and provide improvements in various technological fields. Without limitation, example and non-limiting technology improvements include improvements in performance of all aspects of round balers.

Certain operations described herein include operations to interpret or determine one or more parameters. Interpreting and determining, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a non-transient computer readable storage medium, receiving the value as a run-time parameter by any means known in the art, and/or by receiving a value by which the interpreted or determined parameter can be calculated, and/or by referencing a default value that is interpreted or determined to be the parameter value.

Figure 4:
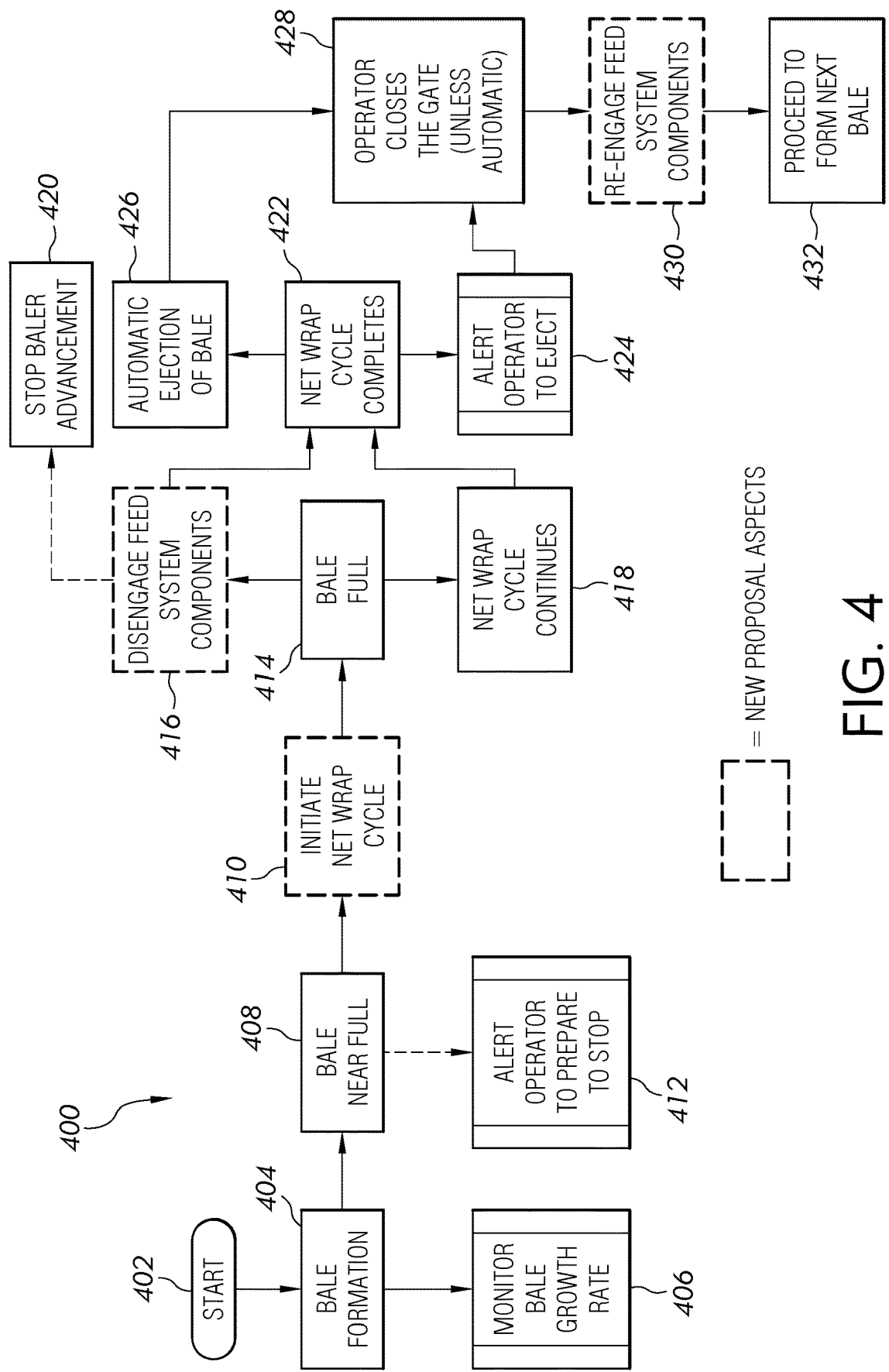
FIG. 4 is a flow diagram illustrating an example procedure for determining a net wrap cycle process.

Certain systems are described following, and include examples of controller operations in various contexts of the present disclosure. One example embodiment 400 of a flow diagram of an example procedure is illustrated in FIG. 4 for determining a net wrap cycle for the round baler 50 that is in communication with the electronic controller 100. Procedure 400 begins at operation 402 wherein the round baler 50 has begun gathering or collecting a crop material in the baling chamber 68 to form a bale at bale formation 404. The electronic controller 100 monitors a net wrapping condition of the cylindrical bale in the baling chamber 68 in response to operation of the crop supply assembly 54 at operation 406. Operation 406 includes the electronic controller 100 monitoring a diameter growth rate of the bale.

Figure 5:
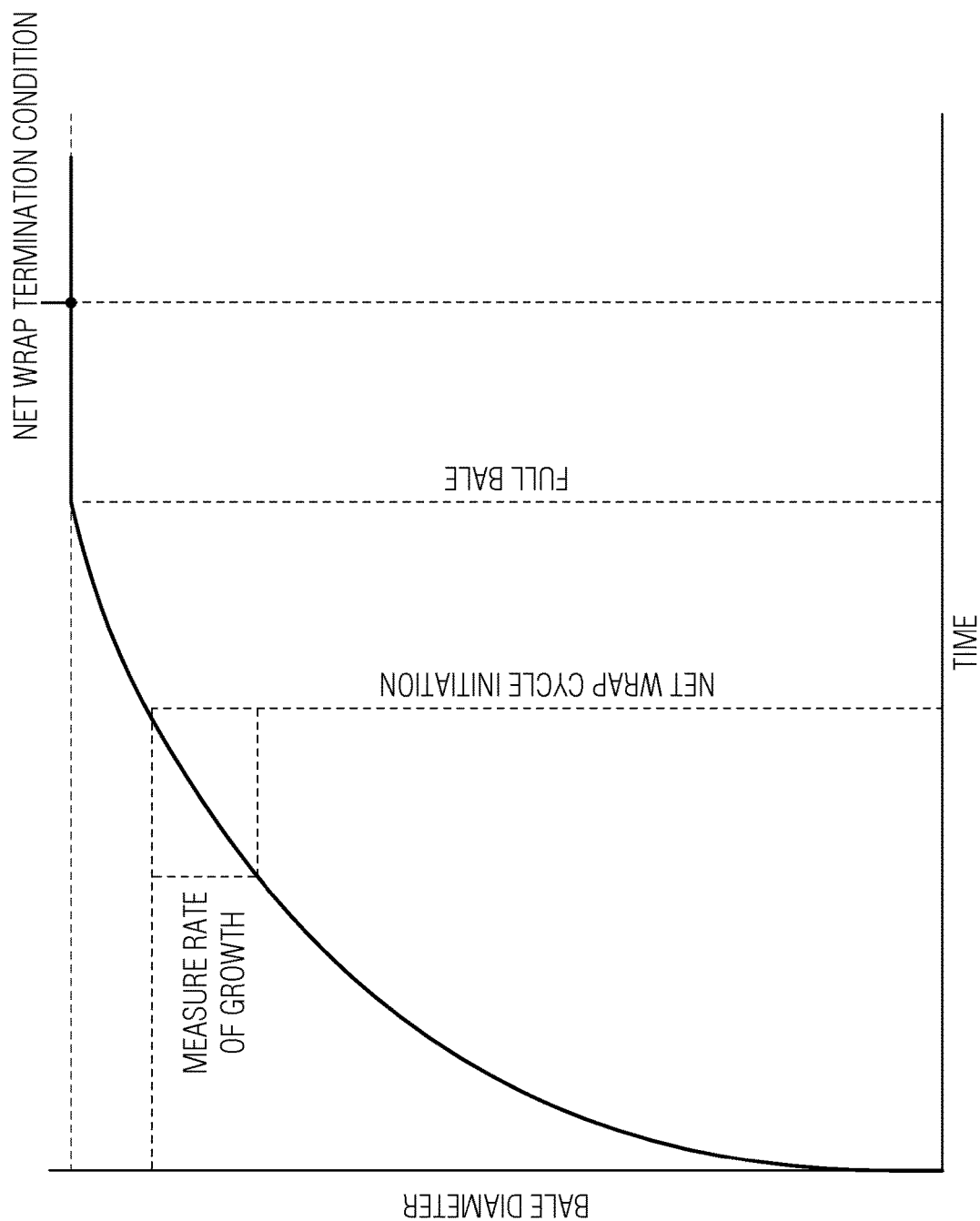
FIG. 5 is a chart illustrating the net wrap cycle timing conditions.

The growth rate of the bale at operation 406 is further illustrated in FIG. 5 wherein electronic sensor or potentiometer 150 monitors a diameter growth rate of the cylindrical bale in the baling chamber 68. More specifically, the electronic sensor or potentiometer 150 monitors or measures the amount of time for the diameter growth and compares this to a stored or set value for a net wrap cycle initiation. The electronic sensor or potentiometer 150 continues to monitor or measure the diameter growth rate of the bale in the baling chamber 68 after the net wrap cycle initiation until a full bale condition is satisfied.

Returning to FIG. 4, the procedure 400 continues from operation 406 to a bale near full condition 408 during which the electronic controller 100 monitors the bale diameter growth rate to determine if a net wrapping condition has been satisfied. Upon satisfaction of the net wrapping condition, the electronic controller 100 initiates a net wrap start event to dispense a first portion of the net wrap material 71 from the net wrap unit 69 at operation 410. In one form, the net wrapping condition includes a diameter growth rate measurement of the cylindrical bale being equal to or greater than a net wrap initiation threshold. The diameter growth rate can be measured in inches/second or millimeters/second growth. The electronic controller 100 is configured to measure a diameter of a cylindrical bale in the baling chamber 68. In another form, the electronic controller 100 is configured to estimate a growth rate of the diameter of the cylindrical bale in response to operation of the crop supply assembly. In another form, the net wrapping condition includes an estimated time period for the net wrap material 71 to circumferentially wrap the cylindrical bale. In one form, the net wrapping condition includes the estimated growth rate satisfying or being equal or greater than a net wrap initiation threshold. In one example, when the bale is built at a diameter rate of 1 inch/second, and the net wrap initiation threshold is 5 inches from a full or target bale diameter, then the net wrap cycle will start because at 5 seconds left in the current crop conditions the baler 50 will build 5 inches of diameter of the bale by accumulating crop material.

Optionally, the procedure 400 continues from the bale near full condition 408 to operation 412 in which the electronic controller 100 sends an alert to the operator to prepare to stop forward motion of the round baler 50. The round baler 50 can continue collecting crop material and/or forward motion of the towing vehicle 99 after operation 410. Alternatively, the electronic controller 100 is configured to automatically stop forward motion of the round baler 50 at operation 412 or stop forward motion of the round baler 50 at a later time at operation 420.

Figure 6:
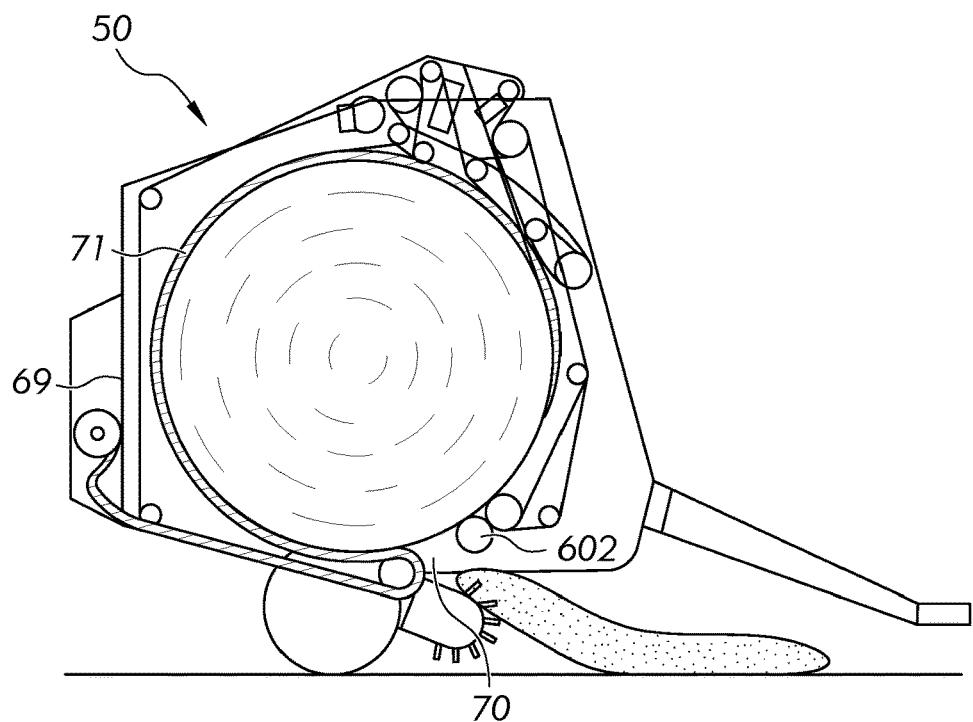
FIG. 6 is a schematic view of a net wrapping condition of the net wrap cycle.

Procedure 400 continues from operation 410 to operation 414 wherein the electronic controller 100 determines a full bale condition has been satisfied. In one form, the full bale condition includes a diameter of the cylindrical bale being equal to or greater than a net termination condition of the cylindrical bale. Illustrated in FIG. 6 is the full bale condition wherein the net wrap material 71 is approaching the inlet 70 and an uncovered portion 602 of the bale remains when the full bale condition is satisfied.

Figure 7:
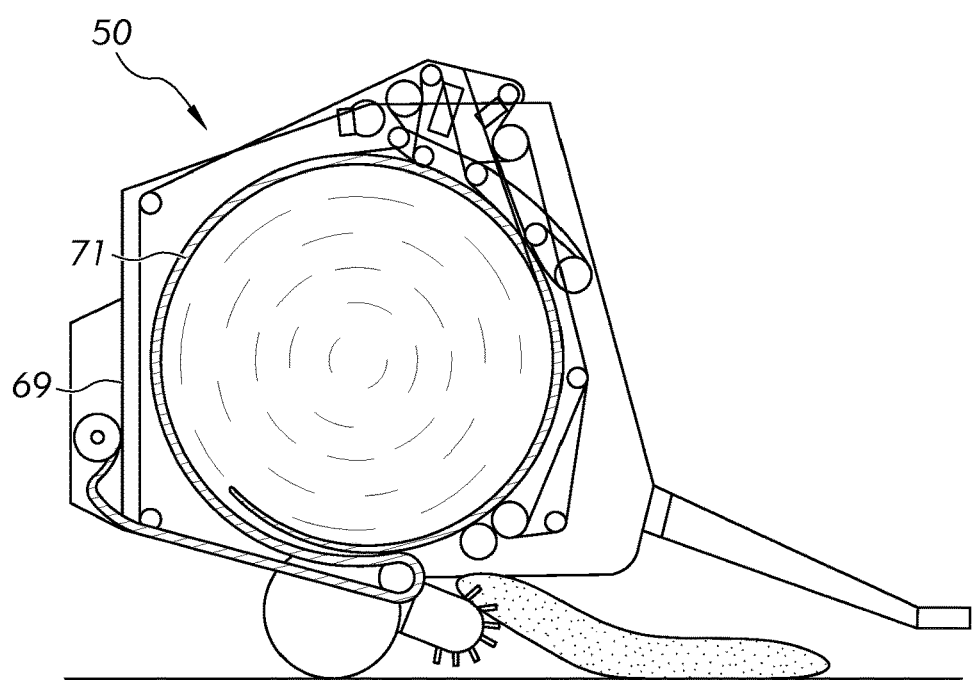
FIG. 7 is a schematic view of a full bale condition of the net wrap cycle.

Procedure 400 continues from operation 414 to operation 416 wherein the electronic controller 100 disengages at least one component from the crop supply assembly 54 to stop operation of the crop supply assembly 54 when the cylindrical bale has satisfied the full bale condition. In one form, the component from the crop supply assembly 54 is the pickup device or take-up device 72. Alternatively, any or all of the components from the crop supply assembly 54 can be disengaged at operation 416. Moreover during operation 416 the electronic controller 100 activates the clutch device to automatically disengage the pickup device or take-up device 72. Operation 416 can include any or all of the clutch devices being dis-engaged to stop operation of any or all of the pickup device or rotor assemblies. Operation 416 enables the net wrapping of the bale with the net wrap material 71 such that additional crop material does not become lodged between layers of the net wrap material 71 as it is placed around the bale as illustrated in FIG. 7.

Procedure 400 can optionally continue from operation 416 to operation 420 wherein the electronic controller 100 is configured to initiate a stopping event for the round baler 50 such that the round baler 50 is restricted from movement along the ground surface in response to determining the net wrapping condition or initiating the net wrap start event. As discussed previously, the electronic controller 100 can be configured to automatically stop forward motion or travel of the round baler 50 in response to determining the net wrapping condition in lieu of the operator stopping the round baler 50.

Procedure 400 continues from operation 414 to operation 418 wherein the net wrap cycle continues such that the net wrap unit 67 continues to dispense net wrap material 71 around the bale in the baling chamber 68. Procedure 400 continues from operation 418 and from operation 416 to operation 422 wherein the electronic controller 100 is configured to initiate a net wrap finish event to dispense a second portion of the net wrap material 71 from the net wrap unit 67 in response to a full bale condition of the cylindrical bale.

Procedure 400 continues from operation 422 to either operation 424 or operation 426. Operation 424 includes sending an alert to the operator to prepare for and eject the full bale from the baling chamber 68 wherein the operator manually opens the discharge gate 69 on the baler 50 and ejects the bale from the baling chamber 68. Operation 426 includes the electronic controller 100 being configured to automatically open the discharge gate 69 on the baler 50 and eject the bale from the baling chamber 68.

Procedure 400 continues from operation 426 to operation 428 wherein the operator or the electronic controller 100 closes the gate or door on the baler 50. Procedure 400 continues from operation 428 to operation 430 wherein the electronic controller 100 is configured to re-engage the component from the crop supply assembly 54 to enable operation of the crop supply assembly 54. In one form, the component from the crop supply assembly 54 is the pickup device or take-up device 72. Alternatively, any or all of the components from the crop supply assembly 54 can be engaged at operation 430. Moreover during operation 430 the electronic controller 100 activates the clutch device to automatically engage the pickup device or take-up device 72. Operation 430 can include any or all of the clutch devices being re-engaged or engaged to begin operation of any or all of the pickup device or rotor assemblies.

Procedure 400 continues from operation 430 to operation 432 wherein the operator can begin forming a new bale in the baling chamber 58 by advancing the baler 50 along the ground surface and operating the crop supply assembly 54 to collect crop in the baling chamber 58.

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In some instances, the benefit of simplicity may provide operational and economic benefits and exclusion of certain elements described herein is contemplated as within the scope of the invention herein by the inventors to achieve such benefits. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

While embodiments incorporating the principles of the present disclosure have been disclosed hereinabove, the present disclosure is not limited to the disclosed embodiments. For instance, crop harvesting system employing a precutter type feed system including round balers (of all size and chamber types), square balers (of all sizes), and feeder wagons can be configured to incorporate the present disclosure. Also, any crop handling system which includes chopper systems for grain harvesting equipment, for example a combine chopper system, can employ the present disclosure. Consequently, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. An apparatus comprising:
   an electronic controller for a round baler having a baling chamber, a crop supply assembly that passes a crop material into the baling chamber, and a net wrap unit, the electronic controller:
   determines a net wrapping condition of a cylindrical bale in the baling chamber being less than a full bale condition in response to operation of the crop supply assembly;
   initiates a net wrap start event to dispense a first portion of a net wrap material from the net wrap unit to the cylindrical bale at a near full bale condition of the cylindrical bale in response to the net wrapping condition;
   disengages a component from the crop supply assembly to stop operation of the crop supply assembly when the cylindrical bale has satisfied a full bale condition; and
   initiates a net wrap finish event to dispense a second portion of the net wrap material from the net wrap unit to the cylindrical bale in the full bale condition of the cylindrical bale, subsequent to initiation of the net wrap start event and after additional crop has been added to the cylindrical bale from the near full bale condition of the cylindrical bale, in response to the full bale condition of the cylindrical bale being satisfied such that the second portion of the net wrap material includes a first layer and a second layer of the net wrap material that circumferentially wraps the cylindrical bale wherein none of the crop material in the baling chamber is contained between the first and second layers of net wrap material.

2. The apparatus of claim 1, wherein the net wrapping condition includes a diameter growth rate measurement of the cylindrical bale being equal to or greater than a net wrap initiation threshold.

3. The apparatus of claim 1, wherein the net wrapping condition includes an estimated time period for the net wrap material to circumferentially wrap the cylindrical bale.

4. The apparatus of claim 1, wherein the full bale condition includes a diameter of the cylindrical bale being equal to or greater than a net termination condition of the cylindrical bale.

5. The apparatus of claim 1, wherein the component from the crop supply assembly includes a pickup device.

6. The apparatus of claim 5, wherein the crop supply assembly includes a clutch device that disengages the pickup device.

7. The apparatus of claim 5, wherein upon completion of the net wrap finish event the electronic controller ejects the cylindrical bale from the baling chamber and re-engages the component from the crop supply assembly to enable operation of the crop supply assembly.

8. The apparatus of claim 1, wherein the electronic controller initiates a stopping event for the round baler such that the round baler is restricted from movement along the ground surface in response to determining the net wrapping condition.

9. An apparatus comprising:
an electronic controller for a round baler having a baling chamber, a crop supply assembly that passes a crop material into the baling chamber, and a net wrap unit, the electronic controller:
initiates a net wrap start event to dispense a first portion of a net wrap material from the net wrap unit to the cylindrical bale at a near full bale condition of the cylindrical bale in response to a net wrapping condition of a cylindrical bale in the baling chamber being satisfied;
disengages a component from the crop supply assembly to stop operation of the crop supply assembly when the cylindrical bale has satisfied a full bale condition; and
initiates a net wrap finish event to dispense a second portion of the net wrap material from the net wrap unit to the cylindrical bale at a full bale condition of the cylindrical bale, subsequent to initiation of the net wrap start event and after additional crop has been added to the cylindrical bale from the near full bale condition of the cylindrical bale, in response to the full bale condition of the cylindrical bale being satisfied such that the second portion of the net wrap material includes a first layer and a second layer of the net wrap material that circumferentially wraps the cylindrical bale wherein none of the crop material in the baling chamber is contained between the first and second layers of net wrap material.

10. The apparatus of claim 9, wherein the net wrapping condition includes a diameter growth rate measurement of the cylindrical bale being equal to or greater than a net wrap initiation threshold.

11. The apparatus of claim 9, wherein the net wrapping condition includes an estimated time period for the net wrap material to circumferentially wrap the cylindrical bale.

12. The apparatus of claim 9, wherein the full bale condition includes a diameter of the cylindrical bale being equal to or greater than a net termination condition of the cylindrical bale.

13. The apparatus of claim 9, wherein the component is a clutch device, and the crop supply assembly further includes one or more rotors, wherein the clutch device disengages the one or more rotors.

14. The apparatus of claim 9, wherein the electronic controller initiates a stopping event for the round baler such that the round baler is restricted from movement along the ground surface in response to initiating the net wrap start event.

15. The apparatus of claim 9, wherein upon completion of the net wrap finish event the electronic controller ejects the cylindrical bale from the baling chamber and re-engage the component from the crop supply assembly to enable operation of the crop supply assembly.

16. A method comprising:
operating a crop supply assembly to pass a crop material into a baling chamber of a round baler;
determining with an electronic controller a net wrapping condition of a cylindrical bale in the baling chamber being less than a full bale condition in response to operation of the crop supply assembly;
initiating a net wrap start event to dispense a first portion of a net wrap material from a net wrap unit on the round baler to the cylindrical bale in a near full bale condition of the cylindrical bale in response to the net wrapping condition;
disengaging a component from the crop supply assembly to stop operation of the crop supply assembly when the cylindrical bale has satisfied a full bale condition; and
dispensing a second portion of the net wrap material from the net wrap unit to the cylindrical bale in the full bale condition, subsequent to initiation of the net wrap start event and after additional crop has been added to the cylindrical bale from the near full bale condition of the cylindrical bale, in response to the full bale condition of the cylindrical bale being satisfied such that the second portion of the net wrap material includes a first layer and a second layer of the net wrap material that circumferentially wraps the cylindrical bale wherein none of the crop material in the baling chamber is contained between the first and second layers of net wrap material.

17. The method of claim 16, wherein the disengaging the component from the crop supply assembly includes disengaging a clutch device.

18. The method of claim 16, further comprising:
restricting the baler from movement along the ground surface in response to initiating the net wrap start event.

* * * * *